(12) United States Patent
Wagner

(10) Patent No.: US 7,587,985 B2
(45) Date of Patent: Sep. 15, 2009

(54) METHOD AND APPARATUS FOR PRODUCING FINE CARBON PARTICLES

(75) Inventor: Anthony S. Wagner, Austin, TX (US)

(73) Assignee: Clean Technology International Corporation, Sherwood, AK (US)

( * ) Notice: Subject to any disclaimer, the term of this patent is extended or adjusted under 35 U.S.C. 154(b) by 781 days.

(21) Appl. No.: 10/919,069

(22) Filed: Aug. 16, 2004

(65) Prior Publication Data

US 2006/0034746 A1    Feb. 16, 2006

(51) Int. Cl.
*F23G 5/00* (2006.01)
*B01J 19/08* (2006.01)

(52) U.S. Cl. .................. 110/243; 423/445 B; 423/460; 977/844

(58) Field of Classification Search ............. 423/445 B, 423/460, 461, DIG. 12; 588/314, 321; 110/242, 110/243
See application file for complete search history.

(56) References Cited

U.S. PATENT DOCUMENTS

| | | | |
|---|---|---|---|
| 3,066,099 A | | 11/1962 | Mohun |
| 4,357,234 A | * | 11/1982 | Inculet et al. ............. 209/127.3 |
| 4,876,077 A | | 10/1989 | Murakami |
| 5,000,101 A | * | 3/1991 | Wagner ....................... 110/346 |
| 5,167,919 A | | 12/1992 | Wagner |
| 5,271,341 A | | 12/1993 | Wagner |
| 5,359,947 A | | 11/1994 | Wagner |
| 5,431,113 A | * | 7/1995 | Wagner ....................... 110/237 |
| 5,452,671 A | | 9/1995 | Wagner |
| 5,461,991 A | | 10/1995 | Wagner |
| 5,482,601 A | | 1/1996 | Ohshima et al. |
| 5,553,558 A | | 9/1996 | Wagner |
| 5,560,898 A | | 10/1996 | Uchida et al. |
| 5,564,351 A | | 10/1996 | Wagner |
| 5,640,702 A | * | 6/1997 | Shultz ........................... 588/1 |
| 5,705,139 A | | 1/1998 | Stiller et al. |
| 5,753,088 A | | 5/1998 | Olk |
| 5,832,845 A | * | 11/1998 | Wagner ....................... 110/237 |
| 6,037,517 A | * | 3/2000 | Wagner ........................... 588/1 |

(Continued)

OTHER PUBLICATIONS

Written Opinion of the International Search Authority (PCT Rule 43bis. 1) for PCT/US2005/29085 dated Sep. 5, 2006 (3 Pages).

(Continued)

*Primary Examiner*—Stanley Silverman
*Assistant Examiner*—Daniel C. McCracken
(74) *Attorney, Agent, or Firm*—Russell D. Culbertson; The Culbertson Group, P.C.

(57) ABSTRACT

A method includes producing an isolation atmosphere in a phase changing area above a reactant liquid and then injecting a feed material into the reactant liquid. The feed material preferably comprises a quantity of a hydrocarbon compound. The method further includes maintaining the molecules of the injected hydrocarbon compound and any reaction products in contact with the reactant liquid for a period of time sufficient to liberate carbon atoms from the hydrocarbon compound or reaction products and place the liberated carbon atoms in an excited state. Liberated carbon atoms in the excited state are then allowed to traverse a surface of the reactant liquid and flow along a particle formation path through the phase changing area so that the liberated carbon atoms may phase change to the ground state while suspended in the phase changing area.

22 Claims, 2 Drawing Sheets

U.S. PATENT DOCUMENTS

| | | | |
|---|---|---|---|
| 6,069,290 A * | 5/2000 | Wagner | 588/1 |
| 6,195,382 B1 | 2/2001 | Wagner | |
| 6,227,126 B1 * | 5/2001 | Wagner | 110/250 |
| 6,270,735 B2 | 8/2001 | Wagner | |
| 6,346,221 B1 * | 2/2002 | Wagner | 422/184.1 |
| 6,355,857 B1 | 3/2002 | Wagner | |
| 6,540,972 B1 | 4/2003 | Hiura | |
| 6,669,755 B2 | 12/2003 | Wagner | |
| 6,717,026 B2 * | 4/2004 | Wagner | 588/314 |
| 6,929,676 B2 | 8/2005 | Wagner | |
| 7,034,197 B2 | 4/2006 | Wagner | |
| 7,365,237 B2 | 4/2008 | Wagner | |
| 2002/0127169 A1 | 9/2002 | Smalley et al. | |
| 2002/0159943 A1 | 10/2002 | Smalley et al. | |
| 2003/0109768 A1 | 6/2003 | Wagner | |
| 2003/0129119 A1 | 7/2003 | Chiu et al. | |
| 2004/0057896 A1 * | 3/2004 | Kronholm et al. | 423/461 |
| 2004/0191138 A1 | 9/2004 | Wagner | |
| 2005/0261760 A1 | 11/2005 | Weber | |
| 2006/0008403 A1 | 1/2006 | Wagner | |
| 2006/0008405 A1 | 1/2006 | Wagner | |
| 2006/0008406 A1 | 1/2006 | Wagner | |
| 2006/0021510 A1 | 2/2006 | Henley et al. | |
| 2007/0116633 A1 | 5/2007 | Wagner | |
| 2008/0050303 A1 | 2/2008 | Wagner | |
| 2008/0056980 A1 | 3/2008 | Wagner | |

OTHER PUBLICATIONS

International Search Report for PCT/US2005/29085 dated Sep. 5, 2006 (2 Pages).

Dai, "Carbon nanotubes: opportunities and challenges," Elsevier, Surface Science, vol. 500 (2002), 24 pages.

Dresselhaus et al., "Carbon Nanotubes Synthesis, Structure, Properties, and Applications," Topics of Applied Physics, Springer (2001), 7 pages.

Height et al., "Flame synthesis of single-walled carbon nanotubes," Elsevier, Carbon, vol. 24 (2004), 13 pages.

Journet et al., "Large-scale production of single-walled carbon nanotubes by the electric-arc technique," Nature, vol. 388 (Aug. 21, 1997), 3 pages.

Journet et al., "Production of carbon nanotubes," Applied Physics A, Materials Science & Processing, vol. 67 (1998), 9 pages.

Mamalis et al., "Nanotechnology and nanostructured materials: trends in carbon nanotubes," Elsevier, Precision Engineering, vol. 28 (2004), 15 pages.

International Search Report for PCT/US2005/023370 dated Sep. 20, 2006, 2 pages.

Written Opinion of the International Search Authority (PCT Rule 43bis. 1) for PCT/US2005/023370 dated Sep. 20, 2006, 4 pages.

International Search Report for PCT/US2005/045334 dated May 19, 2008, 2 pages.

Written Opinion of the International Search Authority (PCT Rule 43bis. 1) for PCT/US2005/045334 dated May 19, 2008, 5 pages.

International Search Report for PCT/US2006/023962 dated Jul. 18, 2008, 2 pages.

Written Opinion of the International Search Authority (PCT Rule 43bis. 1) for PCT/US2006/023962 dated Jul. 18, 2008, 4 pages.

International Search Report for PCT/US2007/067794 dated Apr. 30, 2008, 2 pages.

Written Opinion of the International Search Authority (PCT Rule 43bis. 1) for PCT/US2007/067794 dated Apr. 30, 2008, 6 pages.

Wagner, "Method and Apparatus for Producing Carbon Nanostructures," filed Oct. 31, 2007, U.S. Appl. No. 11/931,802, 30 pages.

Wagner, "Method and Apparatus for Preparing a Collection Surface for Use in a Produccing Carbon Nanostructures," filed Oct. 31, 2007, U.S. Appl. No. 11/932,020, 34 pages.

* cited by examiner

METHOD AND APPARATUS FOR PRODUCING FINE CARBON PARTICLES

TECHNICAL FIELD OF THE INVENTION

The present invention relates to a method for manufacturing carbon particles from a suitable carbon source. The invention also includes systems for manufacturing fine carbon particles.

BACKGROUND OF THE INVENTION

Carbon exists in a chemically stable, crystalline form known as graphite. Graphite may be found in either laminar hexagonal or laminar rhombohedral form. Carbon in the form of graphite is used in many different industrial and other applications. In particular, graphite is used in lubricants, pigments, and xerographic toner. Since graphite is a naturally occurring mineral, it may be mined, cleaned, and milled to produce the fine graphite particles required for many applications. Graphite may also be synthesized by the thermal and/or oxidative decomposition of natural carbon sources such as petroleum gasses and liquids or coal. U.S. Pat. No. 5,705,139 to Stiller, et al. discloses prior art methods for producing graphite.

There are a number of problems associated with prior art methods for producing fine graphite particles. One problem is that naturally occurring graphite and synthesized graphite may include impurities and contaminants that diminish the effectiveness of the material or may make it unsuitable for certain applications. Also, the milling process used to make fine graphite particles from natural occurring graphite and synthesized graphite may leave the graphite particles larger than desirable or useful for certain applications.

SUMMARY OF THE INVENTION

The present invention provides a method for manufacturing extremely fine, substantially impurity-free carbon particles. The invention also encompasses systems for performing the carbon particle production method and for collecting the resulting fine carbon particles.

A method embodying the principles of the invention includes producing an isolation atmosphere in a phase changing area above a reactant liquid and then injecting a feed material into the reactant liquid. The feed material preferably comprises a hydrocarbon compound, but may include any compound or material including carbon, that is, any carbon bearing material. The method further includes maintaining the molecules of the injected carbon bearing material and any reaction products in contact with the reactant liquid for a period of time sufficient to liberate carbon atoms from the carbon bearing material or reaction products and place the liberated carbon atoms in an excited state. Liberated carbon atoms in the excited state are then allowed to traverse a surface of the reactant liquid and flow along a particle formation path through the phase changing area so that the liberated carbon atoms are enabled to phase change to the ground state in the phase changing area. The resulting ground state carbon material may be in the form of diatomic carbon or small carbon atom structures such as structures made up of one or more hexagonal carbon atom rings. The carbon atom structures produced according to the invention may be referred to as nanocrystalline carbon.

As used in this disclosure and the accompanying claims, an "excited state" for carbon atoms is any electron state above the ground state. In an excited state according to the present invention, the electrons of the liberated carbon atoms may be either at the second energy level, third energy level, or fourth energy level, and including the valence energy level. The "isolation atmosphere" in the phase changing area comprises an atmosphere which encourages the chemically excited carbon atoms to phase change to the ground state at a location spaced apart from any collection surface or structure at the periphery of the phase changing area. An isolation atmosphere is preferably maintained by maintaining a sufficiently low temperature in the phase changing area, limiting the residence time of carbon atoms in the phase changing area, and/or by repelling the chemically excited carbon atoms from surfaces defining the phase changing area. The isolation atmosphere also preferably limits the presence of any constituents that would chemically or physically interfere with the formation of the desired fine carbon particles. For example, the isolation atmosphere preferably includes essentially no oxygen or other constituents that would chemically combine with the excited carbon atoms, and limited amounts of atoms that physically block the excited carbon atoms from combining to form the desired fine carbon particles.

An apparatus or system embodying the principles of the invention includes a reactant liquid vessel for containing a reactant liquid at a reactant liquid level and an injection arrangement for injecting a stream of feed material into the reactant liquid vessel at a point below the reactant liquid level. A phase changing chamber is positioned to receive effluent escaping from the reactant liquid in the reactant liquid vessel in an effluent ejection area, and an isolation condition maintaining arrangement maintains isolation conditions in the phase changing chamber. These isolation conditions enable chemically excited carbon in the effluent to phase change to a ground state while suspended in the phase changing chamber and spaced apart from any surfaces within or defining the phase changing chamber.

These and other advantages and features of the invention will be apparent from the following description of the preferred embodiments, considered along with the accompanying drawings.

DESCRIPTION OF PREFERRED EMBODIMENTS

The claims at the end of this application set out novel features which the Applicant believes are characteristic of the invention. The various advantages and features of the invention together with preferred modes of use of the invention will best be understood by reference to the following description of illustrative embodiments read in conjunction with the drawings introduced above.

Figure 1:
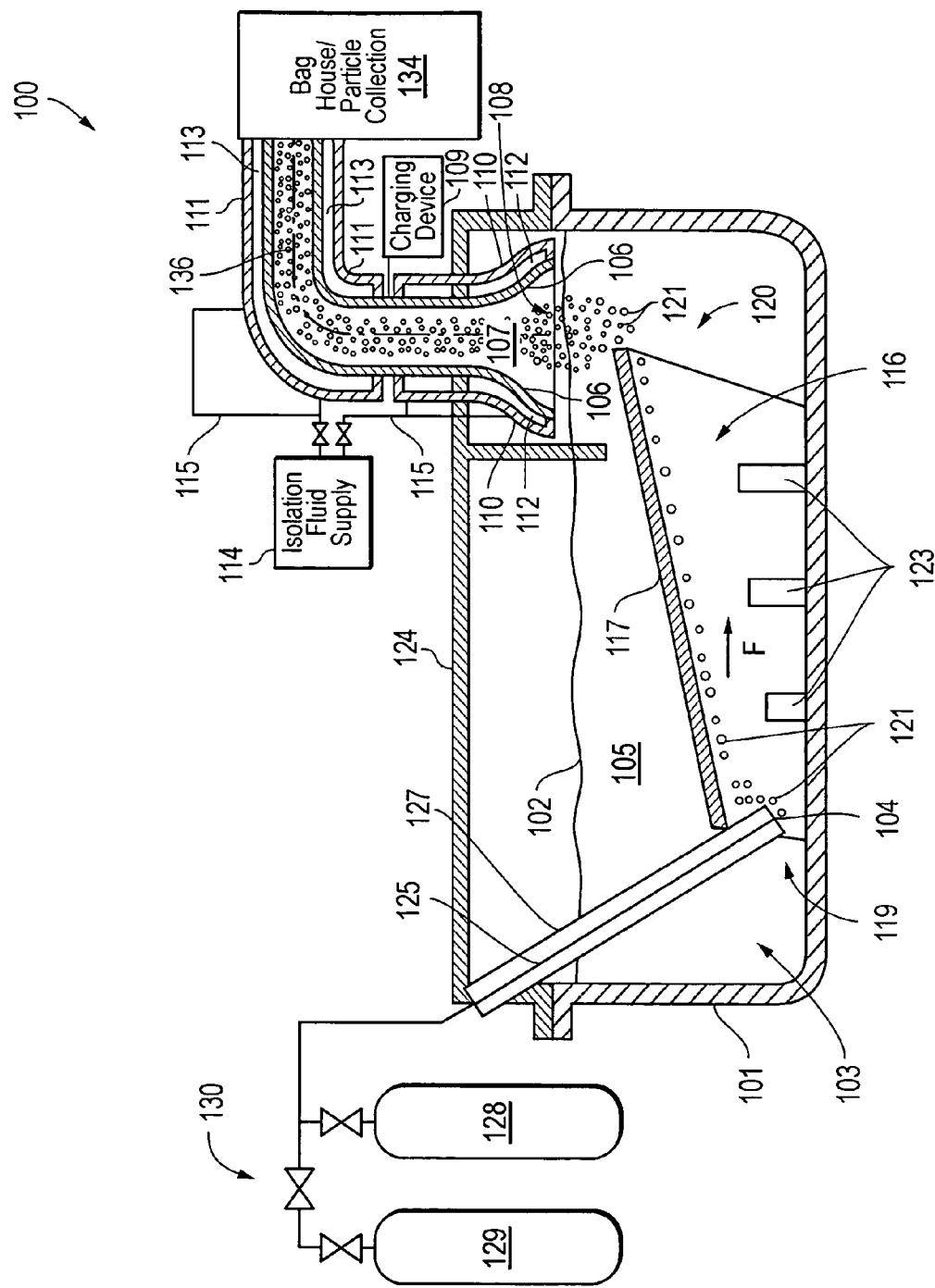
FIG. 1 is a diagrammatic representation of an apparatus embodying the principles of the invention.

Referring to the diagrammatic representation of FIG. 1, an apparatus 100 for producing fine graphite particles according to the present invention includes a reactant liquid vessel 101 for containing a reactant liquid 105 at a reactant liquid level 102. An injection arrangement shown generally at reference numeral 103 allows a stream of feed material to be injected into reactant liquid vessel 101 at an injection point 104 below reactant liquid level 102. Apparatus 100 further includes conduit wall 106 defining a phase changing chamber 107 positioned to receive effluent escaping from the reactant liquid in an effluent ejection area shown generally at reference numeral 108.

Preferred forms of the invention include an isolation arrangement associated with phase changing chamber 107. This isolation arrangement may include an electrical charging device 109 connected to maintain a desired electrical charge state on the inner boundary surface of wall 106 defining phase changing chamber 107. Alternatively, or in addition to charging device 109, the isolation arrangement may include an isolation fluid injecting system for directing an isolation fluid along the inner boundary surface of phase changing chamber 107. FIG. 1 shows an isolation fluid injecting system made up of two separate isolation fluid jackets 110 and 111, defining isolation fluid chambers 112 and 113 respectively. A number of fluid passages (not shown due to the scale of FIG. 1) may extend transversely through the wall 106 of the phase changing chamber 107 to allow the isolation fluid to flow into the area defined by the phase changing chamber. The isolation fluid is supplied from an isolation fluid supply or reservoir 114 shown in FIG. 1 through distribution lines 115 containing appropriate valving and pressure/flow control elements.

Figure 2:
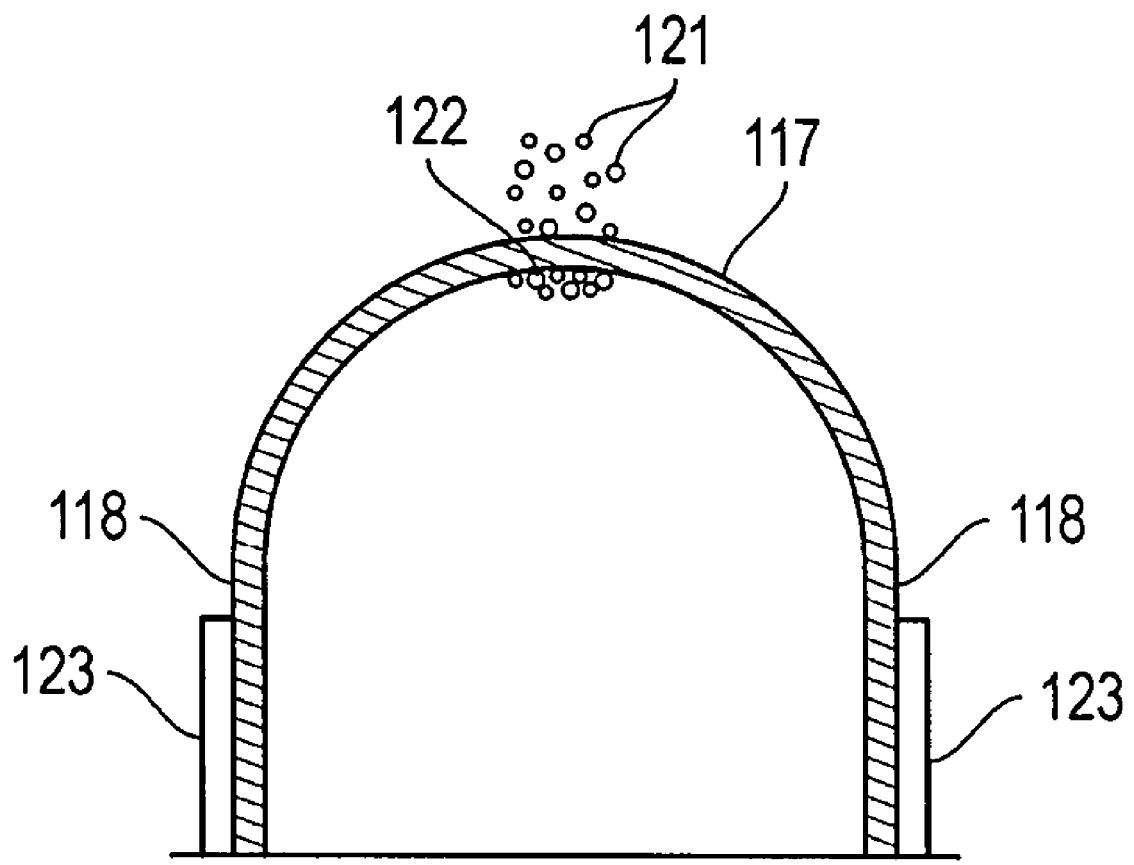
FIG. 2 is a diagrammatic end view of an outlet end of the reaction chamber shown in FIG. 1.

The apparatus shown in FIG. 1 includes a reaction chamber portion formed within vessel 101 below the reactant metal level 102. This reaction chamber is shown generally at reference numeral 116 and is defined by a tunnel structure having an upper wall 117 located below the reactant liquid level 102 in vessel 101. The tunnel structure is best shown in the end view of FIG. 2 and includes side walls 118 in addition to the upper wall 117. Referring again to FIG. 1, the tunnel structure produces an elongated tunnel below the reactant liquid level 102 in vessel 101. Feed material is injected at a feed end 119 of the tunnel structure and reaction products from the reaction of the feed material in the reactant liquid exits the tunnel structure at an outlet end 120. The figures show these reaction products in the reactant metal as bubbles 121. Preferred forms of the tunnel structure include one or more flow channels or lips 122 at the outlet end 120 that each define a location in which the relatively light reaction products collected at the top of the tunnel structure exit the tunnel. The importance of directing the reaction products to particular locations will be described further below in connection with the operation of phase changing chamber 107.

The tunnel reaction chamber structure and reactant liquid vessel arrangement shown in FIG. 1 is similar to the arrangement shown in U.S. Pat. No. 6,227,126 to the present inventor. The entire content of this prior patent is incorporated herein by this reference. The function of the tunnel structure is to help ensure good contact between the reactant liquid and the feed material and between the reactant liquid and any intermediate reaction products that form from initial reactions of feed material. The placement of the tunnel below the reactant liquid level 102 also ensures that a pressure is maintained on the feed material and intermediate reaction products. This pressure results from the column of reactant liquid above the feed material and intermediate reaction products. The tunnel structure shown in the present drawings includes one or more vents or passages 123 spaced apart along the length of the tunnel structure to allow fresh reactant metal to continually flow into the tunnel structure at different points along its length and to help accommodate the expansion of gasses in the tunnel.

The form of the invention shown in FIG. 1 includes an enclosure 124 over reactant liquid vessel 101. It will be appreciated that apparatus 100 will also commonly require an arrangement for heating the reactant liquid to maintain it in a desired temperature range, and an arrangement for circulating the reactant liquid in vessel 101 and especially through the reaction chamber 116 defined by the tunnel structure walls 117 and 118 in the direction shown by arrow F in FIG. 1. Further details on the tunnel structure and the structure of vessel 101 and arrangements for heating and circulating reactant liquid, particularly a liquid reactant metal such as aluminum alone or together with other metals, may be found in U.S. Pat. No. 6,227,126. However, since these details are not necessary for an understanding of the present invention, such details are omitted here.

Feed material injection arrangement 103 includes an injection conduit 125 having an outlet end that extends to injection point 104 below the reactant liquid level 102. The injection point 104 is located so that the feed material exiting the conduit is captured within the tunnel structure under upper wall 117 and thus is forced to flow along the upper wall and along the entire length of the tunnel structure before it can exit the reactant liquid in effluent ejection area 108. This flow along the lower surface of upper tunnel wall 117 helps ensure complete destruction of the feed material and any intermediate reaction products that may form as the feed material is destroyed by reaction with or in the reactant liquid. Injection point 104 is also preferably at a depth below the reactant liquid level 102 to produce a desired reaction pressure due to the column of reactant liquid above the injection point. For a predominantly aluminum reactant liquid this pressure is approximately 2.4 pounds per square inch above atmospheric pressure. Due to the relatively high temperature that may be present in the reactant liquid, conduit 125 is preferably enclosed in a suitable thermal insulating sheath 127 which may comprise one or more layers of insulating material or a jacket through which a cooling fluid may be circulated. The upper end of conduit 125 is connected to a line which ultimately extends to a feed material supply 128 and preferably a purge gas supply 129 through a suitable arrangement of control valves and pressure/flow regulators 130.

Phase changing chamber 107 is located with respect to the outlet end 120 of the tunnel structure so that reaction products 121 are ultimately captured preferably in the middle of the phase changing chamber. That is, the reaction products 121 flow up from flow channels 122 and traverse the surface of the reactant liquid in effluent ejection area 108 into the area defined as phase changing chamber 107 surrounded by chamber wall 106. Phase changing chamber 107 ultimately leads to a particle collection device 134 such as a bag house or other device for removing fine particles from a stream of gas. More than one particle collection device may be included in the apparatus 100 even though only one is shown for purposes of example. Other forms of the invention may include a particle collection arrangement that includes a first device for selectively trapping any particles other than graphite particles exiting the phase changing chamber 107, and a separate device for trapping graphite particles. A particle collection arrangement may alternatively include a carbon collection device first and then a device for collecting other particles that may exit the system through chamber 107.

In the form of the invention shown in FIG. 1, chamber wall 106 that defines phase changing chamber area 107 comprises a downwardly fluted wall that terminates just above the reactant liquid level 102. The fluted wall 106 helps ensure that effluent, including the desired chemically excited carbon atoms, escaping from the reactant liquid in effluent ejection area 108 flows upwardly into the center of the chamber area 107. Other forms of the invention may include non-fluted walls to define phase changing chamber area 107. Also, wall 106, fluted or otherwise, may terminate below reactant liquid level 102 provided that the wall is made of a material that can withstand prolonged contact with the reactant liquid, or are at least is coated with a protective material to allow such prolonged contact. It will be appreciated that all of the components in apparatus 100 that come in contact with the reactant liquid must be made from, or coated with, a material that can withstand contact with the reactant liquid. Preferred materials comprise suitable refractory or ceramic materials particularly where the reactant liquid comprises a reactant liquid metal such as aluminum and mixtures of aluminum and other metals.

A method according to the present invention may now be described with reference to FIG. 1. Such a method includes liberating carbon atoms from a carbon source or feedstock comprising preferably hydrocarbon molecules, and maintaining the liberated carbon atoms in an excited state. This step of liberating carbon atoms is performed in apparatus 100 in FIG. 1 by contacting a carbon source feed material from supply 128 with the reactant liquid in vessel 101. Apparatus 100 ensures sufficient feed material contact time with the reactant liquid by forcing the feed material and any intermediate reaction products to flow the entire length of the tunnel structure defined by upper tunnel wall 117. Also, the reactant liquid is maintained at a suitable reaction temperature to effect the desired liberation of carbon atoms. For example, where the reactant liquid is made up predominantly of aluminum, the liquid is maintained between approximately 650 degrees Celsius and approximately 950 degrees Celsius. Injection point 104 and upper tunnel wall 117 are located deep enough in the reactant liquid to produce a desired reaction pressure, preferably at least 2.4 psig at least at some point in the apparatus, and where the reactant liquid comprises aluminum. These preferred temperature and pressure conditions together with the nature of the reactant liquid ensure the liberation of the desired chemically excited carbon atoms and maintenance of the carbon atoms in the excited state while the carbon atoms remain in the reactant liquid.

The method also includes enabling the liberated carbon atoms in the excited state to traverse the surface of the reactant liquid in the effluent ejection area 108, and directing the liberated carbon atoms in the excited state along a particle formation path 136 through a phase changing area defined as the area of phase changing chamber 107. The particle formation path 136 preferably comprises a path down the center of the phase changing chamber with preferably at least some separation from the inner surface of chamber walls 106. This flow along the particle formation path 136 together with the isolation atmosphere in the phase changing chamber 107 and the temperature conditions in the phase changing chamber enable the liberated, chemically excited carbon atoms to phase change in the phase changing chamber with minimal self-assembly to form very fine carbon particles. The preferred isolation from chamber wall or boundary 106 discourages any collection of carbon atoms on the chamber wall and the formation of carbon nanostructures such as carbon nanotubes.

Enabling the liberated, chemically excited carbon atoms to phase change along particle formation path 136 with minimal self-assembly may include controlling the temperature and effluent flow conditions along the path. In preferred forms of the invention, the temperature in the phase changing area is maintained at a temperature below the temperature of the reactant liquid to encourage phase changing in the desired location. The temperature in phase changing chamber 107 and along path 136 there through may be between 300 degrees Fahrenheit and 3500 degrees Celsius, and preferably around 500 degrees Fahrenheit. The temperature of the reactant liquid where the liquid comprises predominantly aluminum, may be approximately 650 degrees Celsius. A reduction in temperature along phase changing path 136 encourages the liberated carbon to quickly phase change to the ground state. The flow conditions along phase changing path 136 are preferably such that carbon atoms quickly traverse the path, or at least quickly traverse that portion of the path where most of the carbon atoms are phase changing to the ground state, and quickly exit to the particle collection equipment. Maintaining a short residence time in phase changing chamber 107 helps minimize self-assembly and ensures that the resulting particles contain only small carbon particles made up of hexagonal or rhombohedral carbon rings, diatomic carbon, or other small carbon structures.

Maintaining an appropriate isolation atmosphere in phase changing chamber 107 also helps ensure the liberated carbon atoms phase change to form the desired small carbon particles by excluding atoms or molecules that would react with the liberated carbon atoms to form other molecules. In particular, an appropriate isolation atmosphere comprises an atmosphere that does not chemically or physically interfere with the desired carbon particle formation. Purging phase changing chamber 107 of materials that could chemically react with the liberated carbon before it can form the desired fine carbon particles may be particularly important in creating and maintaining the desired isolation atmosphere. Thus, a preferred process includes first purging chamber 107 by directing a suitable purge gas from purge supply 129 to chamber 107. A separate purge arrangement may alternatively or additionally be included in the system with a purge inlet directly in chamber 107 to prevent having to run the purge gas through the reactant liquid. Suitable purge gasses include noble gasses such as argon and helium, inert gasses such as nitrogen, and other gasses such as carbon monoxide, and burner flue gasses from the burner used to heat the reactant liquid.

Several alternate steps may be used to help ensure the desired separation of the liberated, chemically excited carbon atoms from the inner boundary walls 106 defining phase changing chamber 107. In one preferred form of the invention, a suitable isolation fluid, which may comprise any one or more of the above-described purge gasses, is directed to flow along the inner surface of wall 106. In the form of the invention shown in FIG. 1, directing the isolation fluid along the inner surface of wall 106 is accomplished by maintaining a slightly higher pressure in the fluid chambers 112 and 113 than in phase changing chamber 107 to cause the isolation fluid to continually flow through the spaced apart openings (not shown due to the scale of the drawing) through wall 106 leading from the respective fluid chamber 112 or 113 to chamber 107. This isolation fluid maintains a boundary layer of material along wall 106 that makes it difficult for any of the liberated carbon to reach the surface of the phase changing chamber wall.

Any suitable pattern of openings from fluid chamber 112 or 113 to phase changing chamber 107 may be used to create the desired boundary layer along the inner surface of wall 106. The openings should be spaced apart and sized to allow production of the boundary layer without having to inject excessive amounts of the isolation fluid. Also, it will be appreciated that a similar boundary layer effect may be produced without using openings from a jacket chamber such as chambers 112 and 113 to the phase changing chamber 107. Rather, an isolation fluid may be injected through tubes terminating near the entrance of phase changing chamber 107 facing the reactant liquid in vessel 101. A number of isolation fluid injection points at least near the downward facing entrance of chamber 107 would be required around the circumference of wall 106 in order to provide the desired boundary effect along the wall surface. It will also be appreciated that regardless of whether a jacketed arrangement is used or some other arrangement for directing an isolation fluid along the inner surface of wall 106, the temperature of the fluid injected into chamber 107 may be controlled to help produce the desired temperature conditions in the chamber to encourage the liberated carbon atoms to phase change while suspended in chamber 107. The flow of isolation fluid may also be controlled to maintain a laminar flow regime in the isolation fluid along the inner surface of wall 106 and prevent any rapid mixing of the isolation fluid with carbon atom-bearing fluid effluent from the reactant liquid.

Another technique for providing the desired separation of liberated carbon atoms from phase changing chamber wall 106 takes advantage of the electron characteristics of the excited carbon atoms. Since the chemically excited carbon atoms include electrons elevated to a higher energy state in the outer shells of each atom, the atoms may be repelled from a surface having excess electrons, that is, a surface having net negative charge. Thus, the preferred form of the invention shown in FIG. 1 includes charging device 109 connected through a suitable electrical connection to produce the desired negative charge on the wall 106 defining chamber 107. In forms of the invention which employ charging device 109, wall 106 must be formed from a suitable material or coated with some material that can carry the desired electrical charge.

Other isolation techniques may be employed according to the present invention to help isolate the excited carbon atoms exiting the reactant liquid from reaching the inner surface of wall 106 and phase changing to collect at the wall. One such additional technique comprises controlling the effluent ejection area 108 at which effluent exits the reactant liquid so that the effluent enters phase changing chamber at points widely spaced apart from a wall 106. FIG. 1, shows the flow channel 122 directing the reaction products to a point generally centered in the downwardly facing entrance of chamber 107. Causing the effluent to enter chamber 107 at points widely spaced from a wall 106 helps ensure that the liberated carbon atoms have time to phase change to a ground state and form ground state carbon particles prior to reaching the inner surface of wall 106. All of these techniques, the centering of effluent in chamber 107, the injection of isolation fluid, and the electrical charge on the chamber wall 106, may be used together, separately, or in any combination to encourage the chemically excited carbon atoms phase change to a ground state as they bond covalently with other carbon atoms to form fine carbon particles while suspended in phase changing chamber 107.

Any number of reactant liquids may be used to react the feed materials or feed material constituents according to the present invention. A preferred reactant liquid comprises liquid aluminum either alone or with other metals as disclosed in U.S. Pat. No. 5,000,101, which is also incorporated herein in its entirety. Temperatures may preferably range from approximately 650 degrees Celsius to approximately 950 degrees Celsius for reactant metals incorporating a substantial fraction of aluminum. Other reactant liquids may be used within different temperature ranges sufficient to liberate carbon atoms in the chemically excited state for producing the desired fine carbon particles or nanocrystalline carbon in chamber 107. The invention encompasses any liquid that either reacts with the feed material or otherwise causes carbon atoms in the desired excited state to be liberated from the feed material. The chemically excited carbon atoms may be liberated by chemical reduction (as in the case of a reactant liquid made up predominantly of aluminum), by chemical oxidation, by providing chemically neutral electron reduction potentials, or by applying sufficient kinetic energy (through heat) to break the carbon bonds to other atoms in the feed molecules, or by any combination of these mechanisms. The reactant liquid may be a metal, acid, base, salt, or any combination of these. The temperature of the particular liquid will depend upon the particular reaction required to liberate the excited carbon atoms and the nature of the reactant liquid itself. For example, chemically neutral liquids that liberate carbon atoms by heat alone may be held at very high temperatures to produce the desired carbon liberation, on the order of approximately 1500 degrees Celsius or more.

It will be appreciated that some carbon that escapes the reactant liquid may also be diatomic carbon and double or triple bonded carbon. As used in this disclosure and the accompanying claims, "liberated carbon atoms" includes single atom carbon, diatomic carbon, and other two-carbon combinations such as two-carbon double bonded structures and two-carbon triple bonded structures. All of the liberated carbon atoms escaping the reactant liquid will be chemically excited. Some of the two-carbon combinations that may escape the reactant liquid may be incorporated, together with single, chemically excited carbon atoms, into molecularly combined carbon particles within the scope of the present invention.

The present invention may use any number of carbon bearing compounds or materials as the feed material or as part of the feed material. Preferred forms of the invention utilize hydrocarbon compounds including single-bonded carbon either predominantly or exclusively. However, compounds including double and triple bonded carbon may be used according to the invention provided sufficient contact time with the reactant liquid to liberate carbon atoms and place them in a chemically excited state for production of fine carbon particles. Some forms of the invention may adjust the content of the various hydrocarbon materials in a feed material mixture to provide a desired concentration of liberated single carbon atoms and liberated carbon molecules for incorporation into the desired carbon particles. For example, the feed materials may be manipulated so that the effluent escaping the reactant liquid includes carbon in desired relative concentrations of single carbon atoms and double bonded carbon molecules.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method including:
   (a) producing an isolation atmosphere in a phase changing area above a reactant liquid, the phase changing area being included within a phase changing chamber defined by an inner boundary wall including a side wall portion extending transverse to a level of the reactant liquid;
   (b) injecting a feed material into the reactant liquid, the feed material including a carbon bearing material;
   (c) maintaining the carbon bearing material and any reaction products in contact with the reactant liquid for a period of time sufficient to liberate carbon atoms from the carbon bearing material or reaction products and place the liberated carbon atoms in an excited state;

(d) enabling the liberated carbon atoms in the excited state to traverse a surface of the reactant liquid and flow along a particle formation path through the phase changing area; and (e) introducing an isolation fluid into the phase changing chamber at the side wall portion of the inner boundary wall and above the surface of the reactant liquid as liberated carbon atoms in the excited state traverse the surface of the reactant liquid and flow along the particle formation path.

2. The method of claim 1 wherein the liberated carbon atoms are enabled to phase change to the ground state while suspended in the phase changing area.

3. The method of claim 1 wherein the reactant liquid includes liquid aluminum at a temperature at or above 650 degrees Celsius.

4. The method of claim 1 further including the step of maintaining the inner boundary wall under a negative electrical charge.

5. The method of claim 1 wherein the isolation atmosphere includes one or more purge gases selected from a group consisting of nitrogen, helium, argon, carbon monoxide, and heater burner flue gasses.

6. The method of claim 1 further including the step of controlling the temperature of the isolation fluid introduced into the phase changing chamber.

7. The method of claim 1 further including the step of maintaining the phase changing area at a temperature between approximately 300 degrees Fahrenheit and 3500 degrees Celsius.

8. The method of claim 1 wherein the step of maintaining the carbon bearing material and any reaction products in contact with the reactant liquid includes placing the carbon bearing material and reaction products in contact with the reactant liquid under a pressure of at least approximately 2.4 psig.

9. The method of claim 1 wherein the step of maintaining the carbon bearing material and any reaction products in contact with the reactant liquid includes trapping the carbon bearing material and reaction products in a reaction chamber having an upper surface below the surface of the reactant liquid.

10. The method of claim 1 wherein the step of injecting the carbon bearing material into the reactant liquid comprises injecting the carbon bearing material into a bath of reactant liquid at a depth sufficient to produce at least approximately 2.4 psig of pressure on the injected carbon bearing material by the column of reactant liquid above the carbon bearing material.

11. A method including:
(a) liberating carbon atoms from a carbon bearing material by reaction with or in a reactant liquid and maintaining the liberated carbon atoms in an excited state;
(b) enabling the liberated carbon atoms in the excited state to traverse a surface of the reactant liquid and pass into a phase changing area; and
(c) introducing an isolation fluid into the phase changing area at a boundary of the phase changing area and above the surface of the reactant liquid as liberated carbon atoms in the excited state traverse the surface of the reactant liquid and pass into the phase changing area, the boundary at which the isolation fluid is introduced into the phase changing area extending transverse to the surface of the reactant liquid traversed by the liberated carbon atoms.

12. The method of claim 11 further including maintaining a boundary surface under a negative electrical charge, the boundary surface comprising a surface that defines the phase changing area.

13. The method of claim 11 further including the step of controlling the temperature of the isolation fluid introduced into the phase changing area.

14. The method of claim 11 including the step of maintaining the temperature in the phase changing temperature between approximately 300 degrees Fahrenheit and 3500 degrees Celsius.

15. The method of claim 11 further including the step of maintaining the carbon bearing material and reaction products under a pressure of at least approximately 2.4 psig prior to traversing the surface of the reactant liquid.

16. The method of claim 11 further including the step of injecting into the reactant liquid a feed mixture made up of the carbon bearing material and an inert gas.

17. The method of claim 11 wherein the step of liberating carbon atoms from carbon bearing material includes trapping the carbon bearing material and other reaction products in a reaction chamber having an upper surface below the surface of the reactant liquid.

18. An apparatus including:
(a) a reactant liquid vessel for containing a reactant liquid at a reactant liquid level;
(b) an injection arrangement for injecting a stream of feed material into the reactant liquid vessel at a point below the reactant liquid level;
(c) a phase changing chamber positioned to receive effluent escaping from the reactant liquid in the reactant liquid vessel in an effluent ejection area; and
(d) a number of isolation fluid injection openings spaced apart across an inner boundary wall of the phase changing chamber above the reactant liquid level in position to direct an isolation fluid into the phase changing chamber.

19. The apparatus of claim 18 further including an isolation fluid jacket surrounding at least a portion of the phase changing chamber in which the isolation fluid injection openings are located.

20. The apparatus of claim 18 further including a feed material mixing arrangement connected to a carbon bearing material supply and to an inert gas supply.

21. The apparatus of claim 18 further including an arrangement for maintaining negative electrical charge on a surface which defines a portion of the phase changing chamber.

22. The apparatus of claim 21 wherein the surface which defines the portion of the phase changing chamber includes the inner boundary wall having the isolation fluid injection openings.

* * * * *